United States Patent Office 2,957,844
Patented Oct. 25, 1960

2,957,844
POLYTHIOUREA AND POLYEPOXIDE CO-CURED RESINS

George L. Wesp, Dayton, Ohio, assignor to Monsanto Chemical Company, St. Louis, Mo., a corporation of Delaware No Drawing. Filed Dec. 31, 1958, Ser. No. 784,015

7 Claims. (Cl. 260—42)

The invention relates to synthetic resins formed by co-curing mixtures of linear polythiourea polymers and polyepoxide compounds.

Polythiourea high polymers have long been known. They are conveniently prepared by a number of methods, perhaps the simplest being the reaction of a diamine with carbon disulfide; a condensation polymerization is effected wherein hydrogen sulfide is eliminated and the resulting high polymer is called a polythiourea. Various other procedures are available for making polythioureas such as by reaction of a trithiocarbonic acid and a polyamine, reaction of a polyamine with a bis(dithiocarbamate), reaction of a diamine with ammonium thiocyanate, and reaction of a polyamine with a polyisothiocyanate. See U.S. Patent 2,313,871 for further details. The type of diamines and resulting recurring unit in a polythiourea is subject to almost infinite variation. Most polythiourea polymers are of comparatively high melting point, e.g., above 50 or 100° C., and usually above 150° C. The properties of a polythiourea are dependent on the initial reactants and on the extent of polymerization. The most favored type of diamine reactant is the alkylene diamine, e.g., hexamethylene diamine (1,6-diamino-n-hexane), but all sorts of other diamines having straight-chain, branched chain or cyclic structure and consisting of carbon and hydrogen or also including hetero-atoms have also been mentioned as reactants for use in making polythioureas. Principal interest, however, has been in those reactants and reaction conditions which give high melting point fiber-forming polymers. In my copending application Serial No. 422,256, filed April 9, 1954, now U.S. 2,884,401, there is described a rubbery polythiourea having extraordinary solvent resistance and further having good response to reinforcement by carbon black.

It is an object of this invention to provide a new and useful type of resin.

These and other objects of the invention will become apparent as the detailed description of the invention proceeds.

It has now been found that mixtures of linear polythiourea polymers and compounds having two or more epoxy groups, i.e., polyepoxy compounds can be co-cured by heating at elevated temperatures with or without the addition of another curing or cross-linking agent to produce a new and useful type of synthetic resin.

Polythioureas in general are usable in making the resins of the invention. Suitable polythioureas are described in U.S. 2,313,871 and other suitable polythioureas are described in my copending application Serial No. 422,256, filed April 9, 1954. However, the preferred polythioureas for use in the invention can be represented by the following type formula in which the "chain" has at least 2 carbon atoms:

etc. —NR—C—NR————NR—C—NR————NR—C—NR— etc.
         ‖         chain   ‖         chain   ‖
         S                 S                 S In the foregoing formula R preferably represents hydrogen or less preferably a monovalent hydrocarbon radical, especially alkyl. The "chain" can include one or more hetero-atoms such as oxygen, sulfur or nitrogen, the preferred one being oxygen. Where a plurality of hetero-atoms is present, they should be separated from each other by at least one and preferably two or more carbon atoms. Particularly suitable polythioureas are those containing a "chain" of from 2 to about 13 atoms, preferably at least about 7 atoms, between nitrogen atoms of adjacent thiourea residues, the terminal members of such chains being carbon atoms.

Those skilled in the art, having the benefit of the present disclosure will understand various types of reactants and reaction procedure available for making polythioureas having the limitations herein described. As a matter of convenience and referring to the preferred class of reactants the discussion given hereafter will be principally concerned with the reaction of a diamine with carbon disulfide; however, the various other types of reactants known to give polythioureas, for example, as described in the aforementioned U.S. Patent 2,313,871 and elsewhere in the art, can also be used with suitable modifications which will be understood by those skilled in the art.

The preparation of a polythiourea from carbon disulfide and a diamine, generally involves reacting carbon disulfide with a diamine having the formula NHR—X—NHR wherein R is hydrogen or a monovalent hydrocarbon radical, preferably hydrogen, or if a hydrocarbon radical, preferably a lower alkyl group, and where the R's can be the same or different in the diamine, and wherein X comprises a chain of at least 2 carbon atoms and preferably not more than about 13 atoms including one or more hetero-atoms selected from the group consisting of oxygen, sulfur and nitrogen. In theory an equimolar quantity of carbon disulfide and diamine reactants can be used, but it is preferred to charge an excess of carbon disulfide over the theoretical quantity required in order to obtain more efficient reactions; unreacted carbon disulfide is later removed as by evaporation from the polymeric material. The reaction is conveniently effected in a solvent, e.g. methanol, phenol, water, benzene, etc. After initial reaction of carbon disulfide with diamine the resulting material is heated to a temperature which can suitably be within the range of 100 to 200° C. until the condensation polymerization has continued to the desired extent. The reaction liberates hydrogen sulfide which is preferably continuously removed. The reaction period will ordinarily be at least 1 hour and frequently will be within the range of 2 to 6 hours. To a certain extent the reaction time is inversely proportional to the temperature. It is often convenient to carry out the reaction at 2 or more different temperature levels first using a comparatively low temperature and later increasing temperature to obtain the final stages of polymerization.

By way of example and not limitation examples of suitable primary and secondary diamines useful in preparing polythioureas to be used in the practice of the invention can be mentioned:

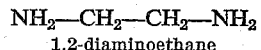
1,2-diaminoethane

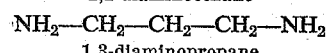
1,3-diaminopropane

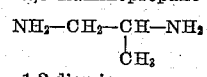
1,2-diaminopropane

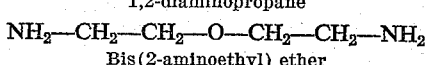
Bis(2-aminoethyl) ether

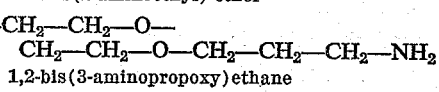
1,2-bis(3-aminopropoxy)ethane

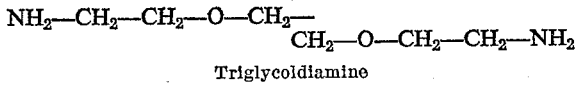

Triglycoldiamine

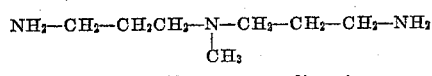

Methyl-bis(3-aminopropyl) amine

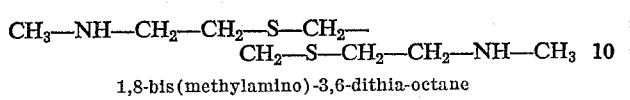

1,8-bis(methylamino)-3,6-dithia-octane

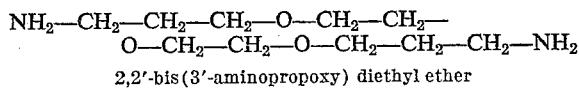

2,2'-bis(3'-aminopropoxy) diethyl ether

It will be seen that all of the foregoing compounds meet the requirement as stated herein. Of course, those skilled in the art will understand that the diamine should not contain the groups which under the conditions employed for the formation of the polythiourea polymer are reactive either with the diamines or with the carbon disulfide. Also those skilled in the art will understand that when the polythioureas are to be prepared from a diamine and a reactant other than carbon disulfide, e.g., a bis(dithiocarbamate) or a diisothiocyanate, the other reactant should conform to the requirements stated herein. It will be apparent that where a single diamine and carbon disulfide are the reactants each recurring unit in the polythiourea molecule will be the same. However, where a mixture of diamines is reacted with carbon disulfide or where a diamine and another compound such as a diisothiocyanate are reacted, the polythiourea polymer can contain recurring units that differ from each other within the same molecule depending upon the starting material.

Polyepoxide compounds usable in making the cured resins of the invention can vary all the way from essentially monomers through low molecular weight to high molecular weight linear polymers depending on the degree of condensation. These compounds can be formed by reacting epichlorohydrin and a polyhydroxy phenol, such as Bis-Phenol-A, which is 2,2-bis(4'-hydroxyphenyl) propane. Such polyepoxy compounds are available commercially from the Shell Chemical Corporation under the name of "Epon" resins, which have the following structure:

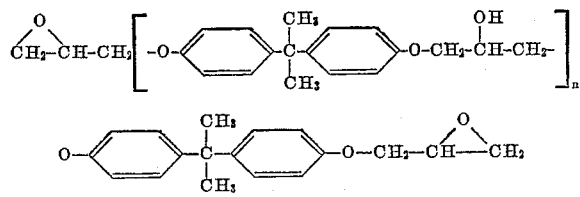

wherein $n$ can vary from 0 to 15. Detailed descriptions of the "Epon" resins and properties thereof are available in the Trade Literature thereon. A detailed description of the chemistry of manufacture of this type of resin is contained in the literature article "Epoxy Resins From Bis-, Tris-, and Tetrakis-glycidyl Ethers," Ind. and Engr. Chem., 45 (1953), 2715–22, by Elizabeth B. Dearborn et al. A further description of the "Epon" resins is contained in U.S. 2,528,932.

It should, of course, be understood that other polyhydroxy compounds than Bis-Phenol-A can be reacted with epichlorohydrin to make suitable polyepoxy compounds. An illustrative list of suitable polyhydroxy aromatic compounds is as follows: 4,4'-dihydroxybiphenyl, catechol, resorcinol, quinol, pyrogallol, phloroglucinol, hydroxyquinone, etc. A number of other suitable polyhydroxy aromatics are named in U.S. 2,528,932. Alternatively, aliphatic polyhydroxy compounds can be used such as: ethylene glycol, propylene glycol, glycerol, pentaerithritol, etc.

Also, other epoxyhalo compounds than epichlorohydrin can be used such as: epibromohydrin, epifluorohydrin, 1-chloro-2,3-epoxybutane, etc. and similar other compounds named in U.S. 2,772,296.

Although certain specific types of polyepoxy compounds and polymers have been discussed in detail above, it should be understood that in general all types of diepoxy or diglycidyl compounds or polymers thereof are usable and not just the "Epon" type, provided the compounds do not contain reactive substituents which would cause undesirable side reactions and products. An illustrative list of a number of these other suitable diepoxy compounds usable in making the cured resins of the invention is as follows: condensation products of epichlorohydrin and ammonia which are compounds of the formula

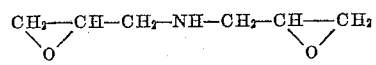

and polymers thereof, compounds of the formula

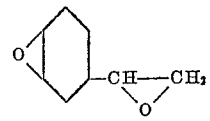

4-vinylcyclohexene dioxide; the diepoxide of bis-cyclopentenyl ether of the formula

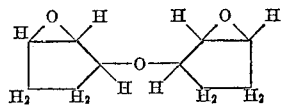

epoxidized ethers of the formula

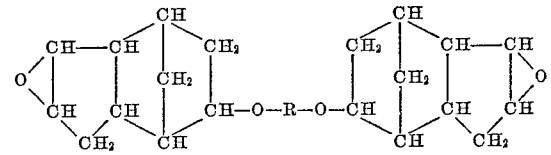

in which R is the radical of a glycol such as ethylene glycol or a polyalkylene glycol; bis(4-glycidyloxyphenyl) sulfone of the formula

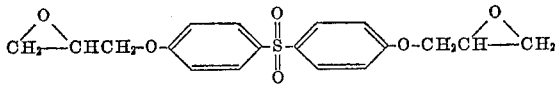

and homopolymers thereof; 2-p-butylhydroxyquinone bis-glycidyl ether of the formula

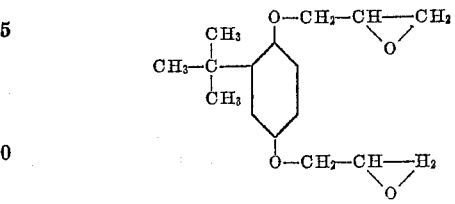

diepoxyesters of polycarboxylic acids, e.g., di(2,3-epoxybutyl)oxalate of the formula

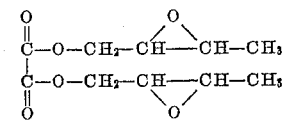

diepoxy fatty acids, e.g., methyl 9,10,12,13-diepoxystearate of the formula

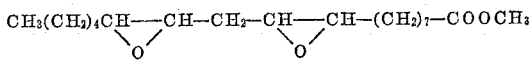

diepoxide of cycloaliphatic esters of monoethylenically unsaturated fatty acids of the formula

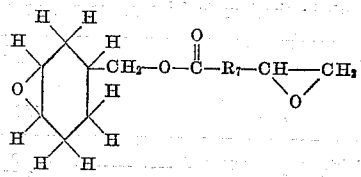

$R_7$ is an alkylene chain containing from 1 to 15 carbon atoms triepoxides such as the compound of the following formula

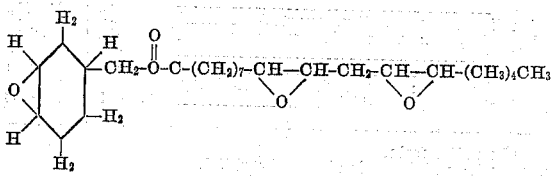

diepoxide of cycloaliphatic esters such as the compound of the formula

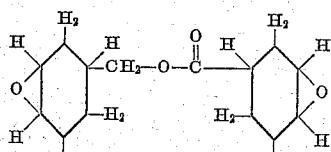

diepoxides such as the compound of the following formula

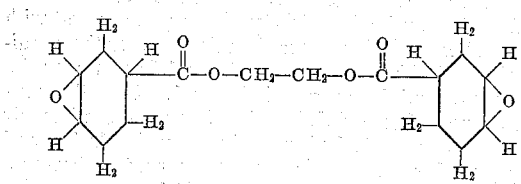

To make the blended co-cured resins of the invention one or more each of the polythiourea polymers and the polyepoxy compounds described above are blended together in any desired portion and co-cured. Normally to obtain a really substantially different resin, the polymer mixture should contain at least about 5 parts by weight of the component of the mixture present in the smaller amount per 95 parts by weight of the component present in the larger amount, and either the linear polythiourea polymer or the polyepoxy compound can be present in the mixture in the smaller amount; however, preferred resins will contain not more than about 50% by weight of the polyepoxy compound. At least about 2 percent of either component in the blend will affect the characteristics of the final cured resin to a measurable degree, however. The components of the mixture can be blended in various ways generally well known, depending on the characteristics of the particular materials to be blended. "Baker-Perkins" mixers can be used if these polymers are viscous liquids and a rolling mill can be used if the polymers are semi-solid. The mixture can be heated to an elevated temperature to melt solid polymer or to increase the fluidity of viscous polymer for improved blending provided temperatures are not used that would cause substantial decomposition of either or both components of the mixture. Fillers such as carbon black and other fillers can be blended into the mixture in a conventional manner. Other curing agents are not required for the polythiourea polymer and polyepoxide mixture, but if it is desired to add supplemental curing agents, normally it would be preferred that they be added last in blending the ingredients together; however, the blending operation of all the ingredients including the added curing agents can be carried out simultaneously, particularly if the added curing agents are not too-fast acting or curing inhibitors are used. If the mixture is particularly fast curing with or without added curing agents, it will be preferred to mix the components and added curing agents, if any, as fast as possible and at as low a temperature as possible to avoid having the polymer blend set up or cure before it can be removed from the mixing vessel; however, there will be times when it will be desired to have the polymer blend cure quickly in the particular vessel or structure into which it has been poured. Rate of curing can in many cases be slowed down by curing inhibitors. Curing agents can be mixed or blended into the polymer mixture in a similar manner as the polymers are blended or by other conventional means.

Depending on the particular mixture involved and added curing agents, if any, curing is preferably carried out at temperatures in the range of about 75 to about 150° C. It is preferred not to use temperatures above about 200° C. and preferably below about 175° C. to avoid substantial decomposition of the reactants. With very reactive components or added curing agents, temperatures as low as 50° C. or even room temperature or lower can be used, if desired.

It should be understood that polythiourea linear polymers and diepoxy compounds will cure without the addition of a curing agent to give excellent cured resins of the invention; however, added curing agents can be used and a number of such agents are discussed in detail below when discussing the experimental data. Normally the amount of these added curing agents will be less than about 15 percent by weight based on the mixture of polythiourea and polyepoxides, and preferably less than 10 percent by weight. Where particularly active curing agents are used, 5 percent or less by weight of the curing agents based on the component mixture can be used. If more than one added curing agent is used, e.g., a different one specifically designed to cure each polymer component, the basis for the amount of curing agent to be added will usually be the amount of the respective component to be cured in the polymer blend.

The invention will be more clearly understood from the following detailed description of specific examples thereof:

EXAMPLE 1

This describes in detail the preparation of a polythiourea polymer. A tared liter flask fitted with a nitrogen inlet, Trubore stirrer, thermometer, dropping funnel and reflux condenser vented through a mineral oil trap, was purged with nitrogen and charged with 265.8 grams (1.508 moles) of 1,2-bis(3-aminopropoxy)ethane and 532 ml. of methanol. Exothermic heat of mixing was noted. The mixture was cooled in an ice bath, the nitrogen purging stopped, and with good agitation 120.6 grams (1.584 moles), 5% excess, of carbon disulfide was added gradually via the dropping funnel, as follows:

| Minutes | °C | $CS_2$, ml. | Remarks |
|---|---|---|---|
| 0 | 2 | 0 | Start. |
| 10 | 16.5 | 34 | |
| 15 | 19 | 50 | Clear, faint green. |
| 20 | 18.7 | 64 | Slightly milky. |
| 30 | 17 | 95 | All $CS_2$ in. |
| 31 | 16.5 | | Suddenly, opaque white. |

After cooling to 4° C. during 1 hour, the stirrer was stopped, and the mixture separated into layers. The upper layer (about 33% of the total) was clear, almost colorless and very fluid. The bottom layer was clear, very light yellow and viscous. On stirring and warming to 25° C. the mixture became homogenous; on recooling to 5° C., phase separation reoccurred. The supernatant layer was decanted and the residue was stored overnight under nitrogen at room temperature. The flask was then fitted with a nitrogen bubbler, placed in an oil bath, and the condenser was changed from reflux to distillation position.

Solvent was then removed by distillation with the stirrer operating. Distillation was essentially complete after 35 minutes, the oil bath temperature going from 98 to 128° C. At this point slow evolution of hydrogen sulfide began and continued at an increasing rate during the next 50 minutes, as the bath temperature was increased to 170° C. After 5 more minutes at 170°–174° C. gas evolution essentially stopped, and the viscous, clear, light green polymer was bubbled with nitrogen and stirred and heated during the next 3.5 hours, at a 180–195° C. bath temperature.

After cooling the resin under nitrogen to about 140°, 0.75 gram of 2-mercaptobenzothiazol (an antioxidant) was stirred in, and the hot viscous mass was dumped into a glass tray, greased with silicone grease. The cooled product was a tacky, clear, very-light-amber semi-solid. The specific viscosity of the product at 1% by weight concentration in dimethylformamide at 25° C. was 0.263.

EXAMPLE 2

This is essentially a duplicate experiment of Example 1 using the same reactants except that a much larger batch of polymer was made in this case. The charge of diamine was 6.902 moles and the ratio of $CS_2$ to diamine was 1.03. The product in this case was a light-amber colored semi-solid having a specific viscosity of 0.311 at 1% by weight concentration in dimethylformamide at 25° C.

EXAMPLE 3

This describes the preparation of another linear polythiourea polymer. Although the same diamine was used as was used in Examples 1 and 2 the ratio of carbon disulfide to diamine was appreciably different and a substantially different product resulted. The carbon disulfide/diamine ratio was 0.90, i.e., instead of using an excess of carbon disulfide as in Examples 1 and 2, an excess of diamine was used in this case. The resultant light-amber colored product was a low molecular weight, amine-terminated polythiourea.

chlorohydrin and Bis-Phenol-A having the general structure described hereinabove. The properties of these two resins set forth in the Trade Literature are as follows:

|  | —Epon— | |
|---|---|---|
|  | 828 | 834 |
| Molecular Weight, average (approx.) | 350 | 450 |
| Specific Gravity, 20/4° C | 1.168 | 1.165 |
| Weight, lbs./gal | 9.73 | 10.27 |
| Epoxy Value, eq./100 g. (approx.): (Pyridinium Chloride Method, approx.) | 0.5 | 0.4 |
| Hydroxyl Value, eq./100 g., approx.: ($LiAlH_4$ Method) | 0.1 | 0.1–0.2 |
| Esterification Value, eq./100 g. (approx.) | 1.3 | 0.9 |
| Melting Point, ° C.: (Durrans' Mercury Method) | 8–12 | 20–28 |
| Color, Max | [1]12 | [2]10 |
| Viscosity | [2]$Z_5$–$Z_6$ | [3]$A_2$–$A_1$ |
| Epoxide Equivalent: (Grams of Resin Containing One Equivalent of Epoxide) | 190–210 | 225–290 |

[1] Based on 100% resin.
[2] Garden 1933: 40% solution in butyl carbitol.
[3] Gardner-Holdt: 40% solution in butyl carbitol.

In Table 1 below the properties of cured solvent-cast films of resins of the invention are reported. The polythiourea used in these tests was the polythiourea of Example 2 dissolved in various percentages in dimethylformamide, and the "Epon" resins used are described in detail in Example 4 above. After adding in the curing ingredients if any, which are shown for each film in Table 1, the ingredients which were mixed in 1 x 2" glass vials were allowed to stand for about 30 minutes, or evacuated at water-pump vacuum for about 3 minutes to remove entrapped air bubbles. The mixtures were then spread on 6 x 6 x 0.1" 24 ST aluminum plate coated with Teflon. These cast films were then dried under the conditions shown in Table 1 and cured for 1 hour under the temperature conditions shown in Table 1. Then the films were stripped off and left hanging freely exposed to air for at least two weeks before testing. In the drying and curing procedure forced air ovens were used to promote solvent removal. Table 1 below should be consulted for the curing additives and the test results.

*Table 1.—Properties of cured solvent cast films*

| Film No. | Percent PTU in DMF | "Epon," 828 | PHR 834 | Additives, DMA* | PHR MF | Drying | | Curing | Strength | Tensile Tests | | |
|---|---|---|---|---|---|---|---|---|---|---|---|---|
|  |  |  |  |  |  | Min. | ° C. | ° C. | p.s.i. | Percent Elongation | Modulus, 300% p.s.i. | TS, In./Min. |
| 1 | 53.5 |  |  |  | 5.0 | 30 | 55 | 105 | 845 | 845 | 265 | 20 |
| 2 | 34.5 | 5 |  | 3.0 |  | 30 | 55 | 105 | 410 | 765 | 110 | 10 |
| 3 | 34.5 | 12 |  | 6.0 |  | 30 | 55 | 105 | 1,585 | 455 | 835 | 10 |
| 4 | 34.5 | 20 |  | 6.0 |  | 30 | 55 | 105 | 2,720 | 320 | 2,460 | 10 |
| 5 | 60.0 |  | 16 | 1.2 |  | 30 | 55 | 105 | 1,570 | 500 | 810 | 20 |
| 6 | 60.0 |  | 34 | 1.2 |  | 30 | 55 | 105 | 3,405 | 185 |  | 5 |
| 7 | 60.0 |  | 55 | 1.2 |  | 30 | 55 | 105 | 2,310 | 100 |  | 5 |
| 8 | 60.0 |  | 105 | 1.2 |  | 30 | 55 | 105 | 1,870 | 80 |  | 5 |
| 9 |  |  |  |  |  |  |  |  | 2,385 | 385 | 1,990 | 20 |
| 10 | 31.0 |  | 44 | 2.4 |  | 200 | 60 | 105 | 4,240 | 120 |  | 10 |
| 11 | 31.0 |  | 44 |  |  | 200 | 60 | 105 | 4,080 | 140 |  | 10 |
| 12 | 31.0 |  | 62.5 | 2.4 |  | 40 | 60 | 75 | 4,960 | 80 |  | 10 |
| 13 | 31.0 |  | 62.5 | 2.4 | 10.0 | 40 | 60 | 75 | 4,060 | 65 |  | 10 |
| 14 | 50.0 |  | 83.5 | 3.6 |  | 45 | 55 | 105 | 2,260 | 108 |  | 5 |
| 15 | 31.0 |  | 107 | 2.4 |  | 200 | 60 | 105 | 890 | 95 |  | 10 |
| 16 | 31.0 |  | 200 | 2.4 | 10.0 | 40 | 60 | 75 | 1,670 | 56 |  | 1 |

PTU—The polythiourea of Example 2.
DMF—Dimethylformamide.
PHR—Parts per 100 parts of PTU.
*—Parts per 100 parts of "Epon."
DMA—Dimethylaminopropylamine.
MF—Melamine-formaldehyde condensation product.
TS—Testing speed stretching films.

EXAMPLE 4

The polyepoxy compounds used in the experiments which will be described in detail below were commercial products called "Epon" resins. The basic chemistry of these epoxy resins has been discussed hereinabove. The particular materials used were "Epon" 828 and 834. Both of these resins are condensation products of epi- At the end of the two-week period for the aging of the film, tensile specimens were made for the test. In the tensile strength tests, the samples were stretched at various rates of speed which are reported in the last column of the table. The first column under Tensile Tests reports the tensile strength of the samples in pounds per square inch (p.s.i.) calculated in the conventional manner. The second column reports the percent elongation of the sample just prior to breakage, and the third column reports the force required to elongate the sample 300 percent. These tensile strength tests are, of course, calculated and measured in the conventional manner taking into consideration the cross-sectional area of the test specimen when calculating the measurement for columns 1 and 3 of the strength tests.

Two curing additives were used in the experiments reported in Table 1. The first of these being dimethylaminopropylamine (DMA) and the second a melamine-formaldehyde condensation product (MF). The curing additive MF is a condensation product of melamine and formaldehyde which is a hydroscopic crystalline powder. Methods of making this type of resin are described in detail in U.S. 2,260,239 when discussing intermediate products produced by stopping condensation at an intermediate stage. These resins have free methylol groups which react in the curing process of the resins of the invention. The DMA is specifically designed to cure the "Epon" resins and the MF is specifically designed to cure the polythiourea polymer.

Table 2 below describes the testing of compounded press-cured resins of the invention. These mixed polythiourea and polyepoxy compounds were compounded on 3 x 8″ Thropp rolls incorporating 45 parts of carbon black and 0.5 part of stearic acid per 100 parts of polythiourea and polyepoxy compounds. It should be noted in Table 2 that no supplemental curing agents were used but rather the two-components co-cured each other. Since the polythioureas have very low melt viscosity, cooling water was usually circulated through the mill roll to keep the mass in a firm removable state and especially to prevent too much precure on the roll.

Moldings were made as 4 x 4″ slabs about 0.04″ thick using an appropriate stainless steel plate between 20.5″ thick chrome-plated steel cauls. The listed cure temperature refers to platen temperature. Platten temperatures measurements with a surface pyrometer showed that caul temperatures were 3–4° C. lower than platten temperatures. It was necessary to use silicon mold release to prevent adhesion. The tensile specimens were die-cut from the cured slab. The specimens were tested at a 20″ per minute cross-head speed. Elongations were not measured directly but were taken from the tracings recorded on the machine. This test data on the properties of compounded press-cured material is shown in Table 2 below.

test reported in Table 2 is a test of the low temperature properties of the rubber. This test is the conventional Clash-Berg test. The curing of the samples of Table 2 was carried out at 150° C.

The co-cured resins of the invention can be used in a great many ways, e.g., in the making of molded goods, gaskets, saturation and plying of fabrics, for making film, for spinning into yarn, to make plastics, textiles, coatings, adhesives, etc.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A resin composition comprising a mixture of a linear polythiourea polymer having recurring units of the formula

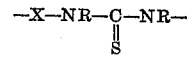

where R is selected from the class consisting of hydrogen and monovalent hydrocarbon radicals, and X consists of a chain having terminal carbon atoms and other atoms selected from the class consisting of carbon and oxygen, nitrogen and sulfur hetero-atoms with each hetero-atom being separated from other hetero-atoms by at least one carbon atom, and a polyepoxy compound having epoxy oxygen atoms attached to adjacent carbon atoms, co-cured to a cross-linked resin.

2. The composition of claim 1, wherein said polyepoxy compound is a condensation product of a polyhydric phenol and epichlorohydrin.

3. The composition of claim 1, wherein said polyepoxy compound is a condensation product of 2,2-bis(4'-hydroxyphenyl) propane and epichlorohydrin.

4. The composition of claim 1, wherein the weight ratio of said polythiourea polymer to said polyepoxy compound is in the range of from about 5:95 to about 95:5.

5. The composition of claim 4, wherein said polyepoxy compound is present in an amount not in excess of about 50% by weight based on said composition.

*Table 2.—Properties of press-cured materials*

| No. | "Epon," 828 | PHR 834 | Cure, Min. | Tensile Tests ||| Hardness, Shore A | Clash-Berg Tf, °C. |
|---|---|---|---|---|---|---|---|---|
| | | | | Strength, p.s.i. | Percent Elongation | 300% Modulus, p.s.i. | | |
| 1 | 10 | | 30 | 2140 | 630 | 1360 | 65 | |
| 2 | 10 | | 15 | 2510 | 530 | 1645 | 67 | +3 |
| 3 | 13 | | 15 | 2970 | 405 | 2405 | 72 | +4 |
| 4 | 15 | | 15 | 3450 | 350 | 3180 | 76 | +5 |
| 5 | | 10 | 15 | 2395 | 560 | 1640 | 66 | |

PHR—Parts per 100 parts of polythiourea.
NOTE.—Cure temperatures in all experiments were 150° C.

The test data above represents the testing of compounded synthetic rubber-like materials made from the resins of the invention. The polythiourea polymer used is described in Example 2 above. The "Epon" resins used, namely, "Epon" 828 and "Epon" 834 are described in detail in the discussion of Table 1 above as well as in Example 4. The tensile tests are described in the introduction to Table 2 and in the discussion of Table 1. The hardness test is a test conventionally used for measuring the hardness of rubber-like material which test is called the "Shore A" penetrometer test for hardness. The last 6. The composition of claim 5, wherein said polythiourea polymer has recurring units of the formula

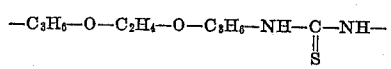

and said polyepoxy compound is a condensation product of 2,2 - bis(4' - hydroxyphenyl)propane and epichlorohydrin.

7. The composition of claim 1, wherein said polythiourea polymer has recurring units of the formula $$-C_3H_6-O-C_2H_4-O-C_3H_6-NH-\underset{\underset{S}{\parallel}}{C}-NH-$$

and said polyepoxy compound is a condensation product of 2,2-bis(4'-hydroxyphenyl)propane and epichlorohydrin.

References Cited in the file of this patent

UNITED STATES PATENTS

| | | |
|---|---|---|
| 2,356,764 | Kern | Aug. 29, 1944 |
| 2,782,089 | Rakowski et al. | Feb. 19, 1957 |
| 2,816,879 | Wittbecker | Dec. 17, 1957 |
| 2,884,401 | Wesp | Apr. 28, 1959 |